United States Patent [19]
Satoh

[11] Patent Number: 5,217,254
[45] Date of Patent: Jun. 8, 1993

[54] AIR BAG SYSTEM FOR ASSISTANT DRIVER

[75] Inventor: Takeshi Satoh, Shiga, Japan

[73] Assignee: Takata Corporation, Tokyo, Japan

[21] Appl. No.: 820,653

[22] PCT Filed: Jun. 21, 1991

[86] PCT No.: PCT/JP91/00842

§ 371 Date: Jan. 17, 1992

§ 102(e) Date: Jan. 17, 1992

[87] PCT Pub. No.: WO92/00207

PCT Pub. Date: Jan. 9, 1992

[30] Foreign Application Priority Data

Jun. 22, 1990 [JP] Japan .................. 2-164639

[51] Int. Cl.⁵ .............................................. B60R 21/20
[52] U.S. Cl. ................................. 280/732; 280/743
[58] Field of Search ............. 280/730, 731, 732, 743

[56] References Cited

U.S. PATENT DOCUMENTS

| | | | |
|---|---|---|---|
| 3,801,123 | 4/1974 | Jira | 280/731 |
| 3,944,250 | 3/1976 | Wulf et al. | 280/732 |
| 3,945,665 | 3/1976 | Tsutsumi et al. | 280/731 |
| 5,004,266 | 4/1991 | Miller et al. | 280/743 |

FOREIGN PATENT DOCUMENTS

| | | |
|---|---|---|
| 2111898 | 9/1972 | Fed. Rep. of Germany . |
| 2100364 | 3/1972 | France . |
| 2164248 | 7/1973 | France . |

Primary Examiner—Kenneth R. Rice
Attorney, Agent, or Firm—Kanesaka and Takeuchi

[57] ABSTRACT

Herein disclosed is an assistant driver's air bag system (10) of the type, in which a folded air bag (18) is accommodated in a sub-container (20) and in which the sub-container (20) is inserted into a main container (12) to facilitate the assembling operation of the air bag system (10). The folded air bag (18) and air bag inflating inflaters (16) are held by holding members (12 and 20), and a module cover (14) covering the air bag (18) is attached to the holding member (12). The holding members are composed of the main container (12) fixed on a vehicle and the subcontainer (20) inserted into the main container (12) and formed with holes (21) for allowing gases from the inflaters (16) to pass therethrough. The air bag (18) is accommodated in the sub-container (20).

5 Claims, 5 Drawing Sheets

AIR BAG SYSTEM FOR ASSISTANT DRIVER

TECHNICAL FIELD

The present invention relates to an assistant driver's or passenger's air bag system which is mounted on a vehicle for expanding at an instant of collision of the vehicle to protect the assistant driver.

BACKGROUND TECHNIQUE

In the assistant driver's or passenger's air bag system of this kind, an air bag and an inflater are attached to a holding member (e.g., a container), and a module cover is further attached to cover the air bag. At the collision of a vehicle, the inflater operates so that the air bag expands. The module cover is opened into the compartment as it is pushed by the expanding air bag until the air bag largely expands in the compartment to protect the assistant driver.

This module cover is formed with a tear starting line (or tear line) or a bend starting line so that it is pushed by the air bag, when the inflater operates. Then, the module cover is torn or bent along that starting line until it is opened into the compartment.

The assistant driver's air bag system of this kind has to be firmly fixed to the vehicle and to constitute a container which will not be deformed by the gas pressure of the inflater. Thus, the container is frequently made of a thick metal. To the container, moreover, there is fixed the inflater having a heavy weight before the assembly of the air bag. As a result, the weight of the container is so high that heavy works are required for assembling the air bag system (especially for fitting the folded air bag in the container). Specifically, the folded air bag is snugly accommodated in the container while changing the direction of the container many times. This requires manual works for handling the heavy container. Thus, a high man power is required for charging the air bag to thereby raise problems that the working fatigue is serious and that the assembling efficiency is low.

DISCLOSURE OF THE INVENTION

In an assistant driver's or passenger's air bag system of the present invention, a holding member is constructed of a main container and a sub-container such that an inflater is fixed to the main container whereas an air bag is accommodated in the sub-container.

According to the present invention, there is provided an assistant driver's air bag system of the type, in which a folded air bag and an inflater for inflating the air bag are held by a holding member and in which a module cover for covering the air bag is attached to the holding member, wherein the holding member includes a main container fixing the inflater thereto and fixed to a vehicle, and a sub-container inserted into the main container and having a hole for allowing a gas from said inflater to pass therethrough, and wherein the air bag is accommodated in the sub-container.

The assistant driver's air bag system of the present invention is assembled by accommodating an air bag in the light sub-container and subsequently by accommodating the sub-container in the main container. This makes it unnecessary to move the heavy main container many times so that the labors can be lightened.

BEST MODE FOR CARRYING OUT THE INVENTION

Figure 1A:
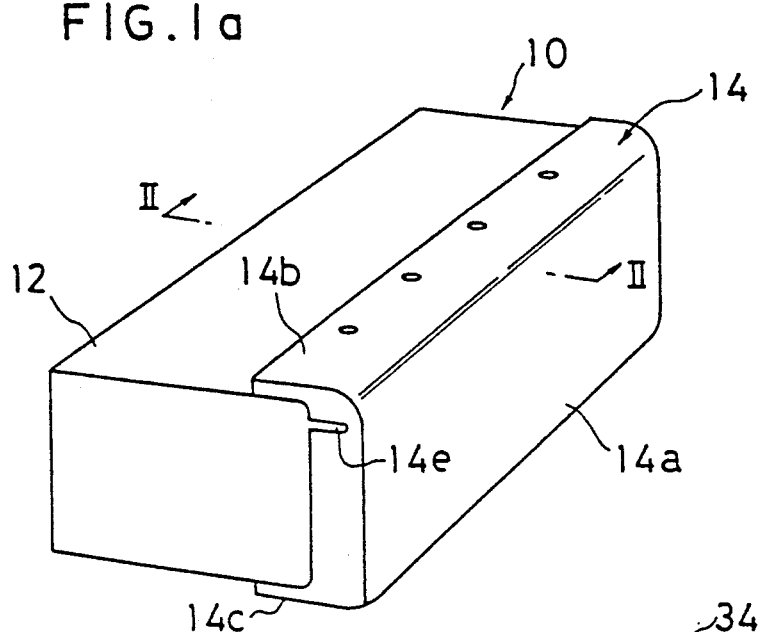
FIG. 1a is a perspective view showing an air bag system according to one embodiment of the present invention.

An embodiment will be described in the following with reference to the accompanying drawings.

FIGS. 1 to 8 show an air bag system according to the embodiment of the present invention.

In this air bag system 10, a holding member is constructed of a main container 12 and a sub-container 20. A module cover 14 is attached to the front face of the main container 12. Inflaters 16 are fixed in the main container 12. In this main container 12, there is inserted the sub-container 20, in which an air bag 18 is fitted in a folded state. The sub-container 20 is formed with holes 21, through which the gas released from the inflaters 16 is allowed to pass to inflate the air bag 18.

The main container 12 is formed into a box shape which has its front face opened. A mounting frame 22 having an L-shaped section is attached to the inner peripheral edge of the open face of the main container 12. The flange 20a of the sub-container 20 and the flange 18a of the air bag 18 are individually fixed to the back of the frame 22 by means of rivets 24.

Designated at reference numeral 18b is a cloth member (or masking cloth) which is disposed on the front face portion of the air bag 18. The cloth member 18b is interposed between the air bag 18 and the module cover 14 to prevent direct contact between the air bag 18 and the module cover 14.

This module cover 14 is equipped with: a body 14a sized to cover the open front face of the main container 12; an upper flange 14b extending from the upper side portion to the back of the cover body 14a; a lower flange 14c extending from the lower side to the back of the body 14a. Moreover, the body 14a has its back formed with ribs 14d and grooves 14e for facilitating the opening of the body 14a.

Figure 2:
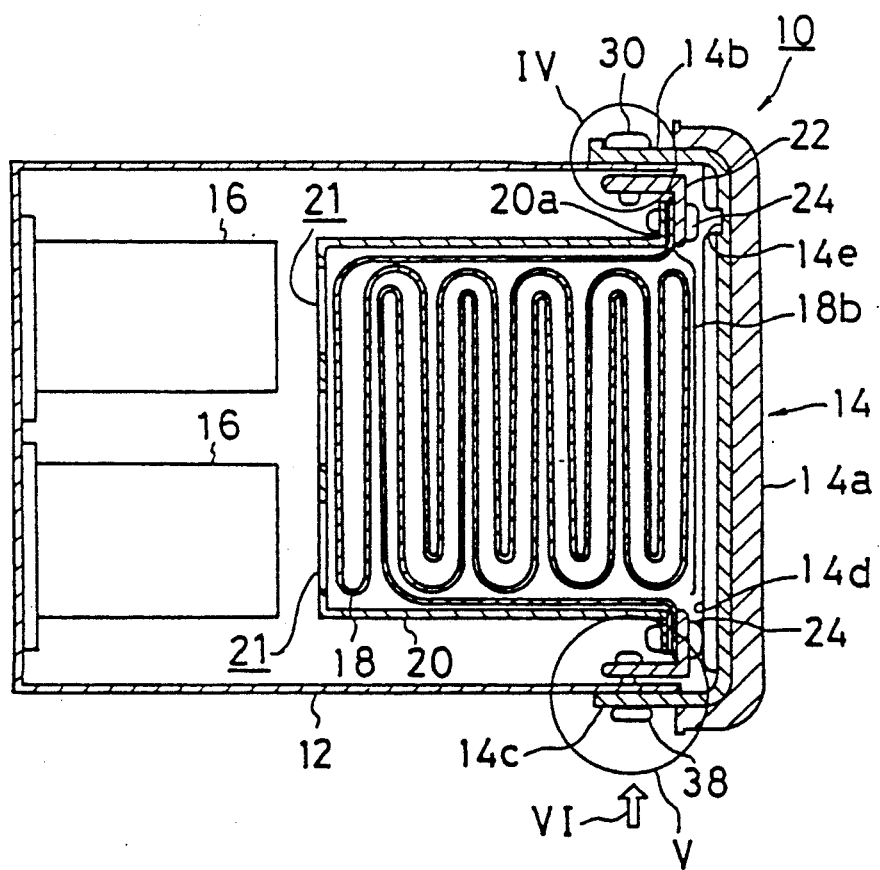
FIG. 2 is a section taken along line II—II of FIG. 1.
Figure 3:
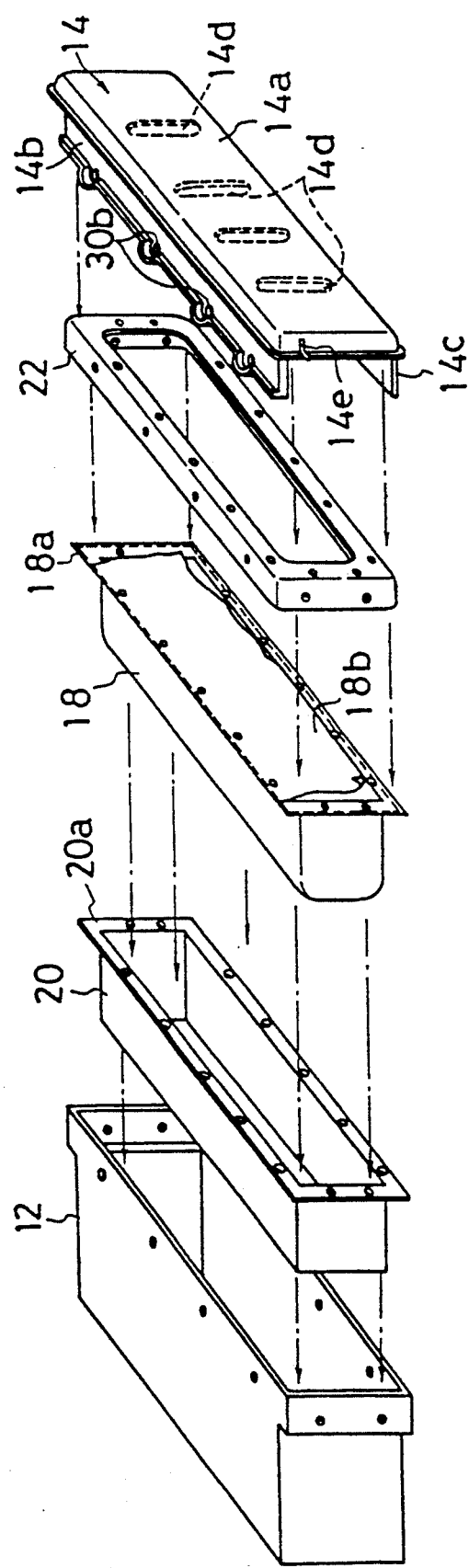
FIG. 3 is a perspective view showing the assembly.
Figure 4:
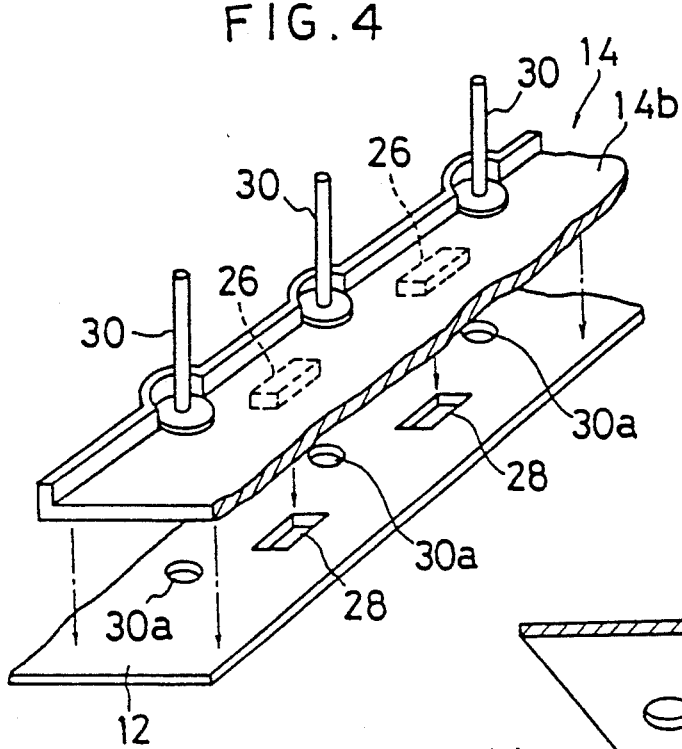
FIGS. 4 and 5 are perspective views showing the assembly of essential portions.

As shown in FIG. 4 presenting an enlarged perspective view showing the portion IV of FIG. 2, the upper flange 14b is formed on its lower face with projections 26, and the container 12 is formed in its upper face with openings 28 to fit the projections 26 therein. The upper flange 14b and the main container 12 are connected, after having been formed with the projections 26 and the openings 28, by means of rivets 30. These rivets 30 also connect the frame 22 to the upper face of the main container 12. Reference numeral 30a designates rivet holes at the container side, and numeral 30b designates rivet holes at the module cover side.

Here, in the present embodiment, the module cover 14 has a two-layer laminated structure composed of a surface layer (i.e., a layer at the compartment side) and a back layer, which has an extension formed with the rivet holes 30b and slots 32 to be described in the following.

Figure 5:
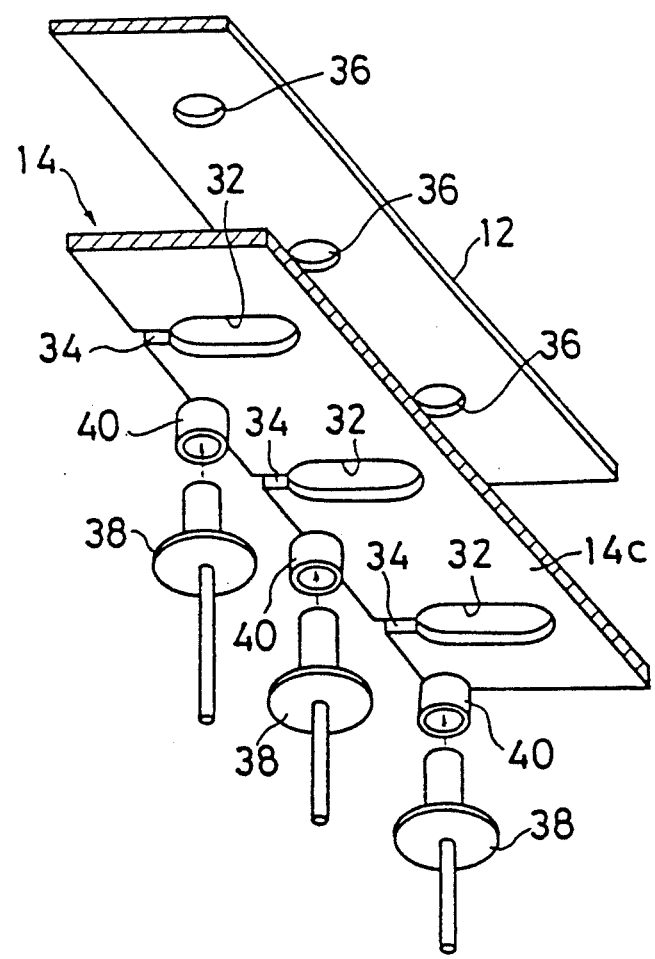
Figure 6:
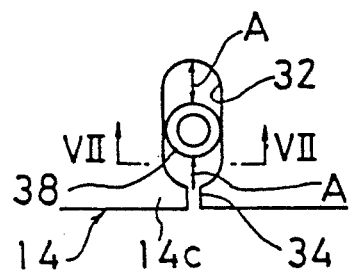
FIG. 6 is a view taken in the direction of arrow VI from FIG. 2.
Figure 7:
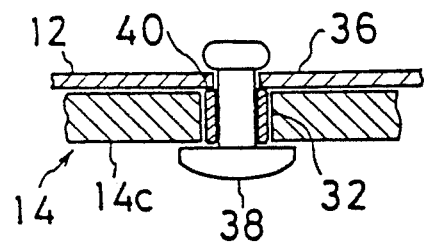
FIG. 7 is a section taken along line VII—VII of FIG. 6.

As shown in FIG. 5 presenting a perspective view showing the assembly of a portion V of FIG. 2, in FIG. 6 presenting a view (i.e., a bottom view) taken in the direction of arrow VI of FIG. 2, and in FIG. 7 presenting a section taken along line VII—VII of FIG. 6, the lower flange 14c is formed with the slots 32 which extend in a direction (toward the inside of the compartment). Slits 34 are further formed to connect one end of each of the slots 32 and the end side of the lower flange 14c. The bottom face of the main container 12 is formed with openings 36, through which rivets 38 pass through the slots 32 to connect the main container 12 and the lower flange 14c. Incidentally, a color 40 is fitted on each rivet 38 and has an external diameter larger than the width of the slits 34.

In order to assemble the assistant driver's air bag system, it is sufficient to fold and fit the air bag 18 in the sub-container 20 and subsequently to insert the sub-container 20 into the main container 12. Since the air bag 18 is thus fitted in the light sub-container 20, the labors for moving the sub-container, even if many times, to fit the air bag 18, are so light that the muscular tissues are hardly fatigued. As a result, the working efficiency is improved. Incidentally, in case the sub-container 20 is to be fitted in the main container 12, it is sufficient to handle and insert the light sub-container 20 into the main container 12. Thus, the works are remarkably simple, and the labors required are light (so that their automations can be easily effected by using robots or the like).

Even if the inflaters 16 are replaced by others having different shapes, the folding manner of the air bag 18 may be identical so long as the sub-container 20 has an identical shape.

Figure 1B:
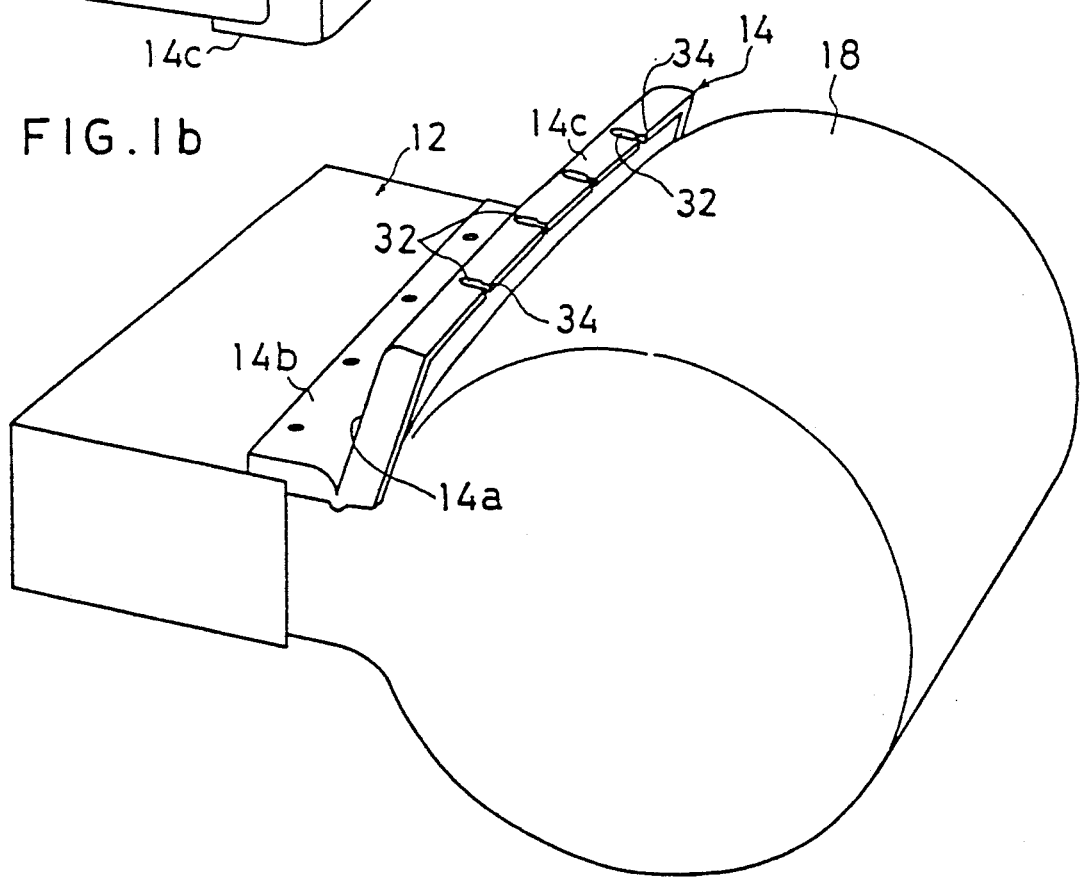
FIG. 1b is a perspective view showing the same embodiment when the air bag expands.
Figure 8:
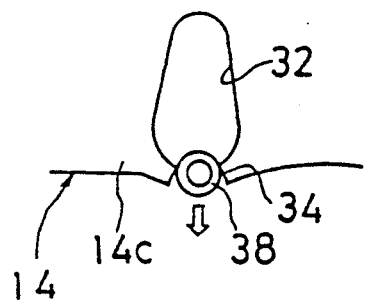
FIG. 8 is an explanatory view showing the engagement and disengagement of a slot and a rivet.

When the inflaters 16 are actuated in the air bag system 10 thus constructed, the air bag 18 is inflated to expand so that the module cover 14 is pushed by the expanding pressure. As shown in FIG. 8, the rivets 38 and the colors 40 pass through the slits 34 so that the lower half of the module cover 14 moves forward. By the expanding force of the air bag 18, moreover, the module cover 14 is bent along the grooves 14e and opened forward so that the air bag 18 expands into the compartment to protect the assistant driver, as shown in FIG. 1(b).

In the present embodiment, the lower flange 14c is formed with the slots 32, and a play (i.e., a portion A in FIG. 6) exists in the engaging portions of the lower flange 14c and the main container 12. Specifically, the lower half of the module cover 14 is allowed to move back and forth freely in the opening direction of the module cover 14 within a range, in which the rivets 38 can move within the slots 32. As a result, the lower half of the module cover 14 can shift into the compartment to prevent any local concentration of stress in the grooves 14e, even if the module cover 14 bears the weight of the air bag 18 at its back, or if the module cover is pushed by the air bag 18 at the time of an acceleration of the vehicle or if the module cover 14 is pushed by the thermal expansion of the air bag 18. Even if, moreover, the assistant driver pushes the module cover 14, the lower half of the module cover 14 shifts in the direction to be pushed into the main container 12. As a result, the occurrence of the local stress at the portion of the grooves 14e can be prevented. Since the local stress concentration at the portion of the grooves 14e can thus be avoided, the grooves 14e can be freed from any material fatigue.

Incidentally, according to the foregoing description, the module cover 14 is so constructed that its lower half can move forward into the compartment and backward into the main container 12. Nevertheless, if the rivets 38 are positioned to contact with the oneend sides of the slots 32 in the longitudinal direction, the module cover 14 is allowed to shift only in the direction toward the other sides of the slots.

In the embodiment thus far described, the module cover 14 is bent along the portion of the grooves 14e. Despite of this description, however, the present invention can naturally be applied to the structure, in which the module cover is torn and opened into the compartment at the time of air bag expansion.

INDUSTRIAL APPLICABILITY

In the assistant driver's air bag system according to the present invention, as has been described hereinbefore, the container is constructed of the heavy main container and the light sub-container, and the sub-container can be inserted, after having been charged with the air bag, into the main container. As a result, the charging works of the air bag can be lightened to improve the assembling efficiency drastically.

In the assistant driver's air bag system according to the present invention, the folded air bag is fitted in the sub-container so that the folding manner of the air bag can be unchanged irrespective of the shape of the inflaters, so long as the sub-container has an identical shape.

What is claimed is:

1. An air bag system for a passenger comprising:
   an air bag,
   a sub-container having a first open face at one side and at least one hole at a side opposite to said first open face, said air bag being folded and completely retained in the sub-container without substantially extending outwardly from the first open face so that when the air bag is inflated, the air bag folded in the sub-container is expanded outwardly through the first open face,
   a main container having a second open face at a front side, said second open face being larger than the first open face so that the sub-container is completely retained inside and fixed to the main container,
   a frame situated between the main container and the sub-container to fix the sub-container to the main container so that the first and second open faces are located to be substantially flush with each other,
   an inflator fixed inside the main contain and situated behind the sub-container, and
   a module cover fixed to the main container for covering the first and second open faces so that when the inflator is actuated upon detection of a predetermined acceleration, the air bag is inflated while opening the module cover.

2. An air bag system according to claim 1, wherein said frame has a rectangular shape and includes an inner portion to be fixed to the sub-container and an outer portion to be fixed to the main container, said air bag having an inner edge, said inner edge being retained and held between the inner portion of the frame and the sub-container so that the air bag is securely attached to the sub-container and gas from the inflator is fully supplied to the air bag.

3. An air bag system according to claim 2, wherein said sub-container has rectangular parallelepiped with a flange around the first open face so that the folded air bag is snugly retained inside the sub-container, said flange being fixed to the inner portion of the frame.

4. An air bag system according to claim 3, wherein said outer portion of the frame is bent perpendicular to the inner portion and is situated inside the main container, said outer portion and said module cover being fixed to the main container by fixing means.

5. An air bag system according to claim 4, wherein said main container has rectangular parallelepiped and retains the sub-container therein, said inflator being situated behind the sub-container to inflate the air bag immediately.

* * * * *